United States Patent
Jeremic et al.

(10) Patent No.: US 11,448,066 B2
(45) Date of Patent: Sep. 20, 2022

(54) LOCATING PASSIVE SEISMIC EVENTS IN A WELLBORE USING DISTRIBUTED ACOUSTIC SENSING

(71) Applicant: Halliburton Energy Services, Inc., Houston, TX (US)

(72) Inventors: Aleksandar Jeremic, Houston, TX (US); Henry Clifford Bland, Calgary (CA); Timur Mukhtarov, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 420 days.

(21) Appl. No.: 16/670,330

(22) Filed: Oct. 31, 2019

(65) Prior Publication Data

US 2021/0131278 A1    May 6, 2021

(51) Int. Cl.
*E21B 47/00*    (2012.01)
*G01V 8/16*    (2006.01)
*G01V 8/14*    (2006.01)
*E21B 49/00*    (2006.01)
*G01V 1/18*    (2006.01)
*E21B 43/26*    (2006.01)
(Continued)

(52) U.S. Cl.
CPC ............. *E21B 49/00* (2013.01); *E21B 43/26* (2013.01); *G01V 1/133* (2013.01); *G01V 1/18* (2013.01); *G01V 1/226* (2013.01); *G01V 1/44* (2013.01)

(58) Field of Classification Search
CPC . E21B 47/00; G01V 1/40; G01V 8/00; G01V 8/14; G01V 8/16
See application file for complete search history.

(56) References Cited

U.S. PATENT DOCUMENTS

| 7,219,729 | B2 * | 5/2007 | Bostick, III | ............. | G01V 1/40 166/250.01 |
| 7,254,999 | B2 * | 8/2007 | Bostick, III | ............. | G01V 1/40 73/152.16 |

(Continued)

FOREIGN PATENT DOCUMENTS

WO    2018101965    6/2018

OTHER PUBLICATIONS

Application No. PCT/US2019/059183, International Search Report and Written Opinion, dated Jul. 28, 2020, 12 pages.
(Continued)

*Primary Examiner* — Kenneth L Thompson
(74) *Attorney, Agent, or Firm* — Kilpatrick Townsend & Stockton LLP (57) ABSTRACT

A well system includes a fiber optic cable positionable downhole along a length of a wellbore. The well system also includes a reflectometer communicatively coupleable to the fiber optic cable. The reflectometer injects optical signals into the fiber optic cable and receives reflected optical signals from the fiber optic cable. Further, the reflectometer identifies strain detected in the reflected optical signals generated from seismic waves of a microseismic event. Additionally, the reflectometer identifies a focal mechanism of the microseismic event and velocities of the seismic waves. The reflectometer also determines a position of the microseismic event using the strain detected in the reflected optical signals, the focal mechanism of the microseismic event, and the velocities of the seismic waves.

17 Claims, 6 Drawing Sheets

(51) Int. Cl.
G01V 1/133 (2006.01)
G01V 1/44 (2006.01)
G01V 1/22 (2006.01)

(56) References Cited

U.S. PATENT DOCUMENTS

| | | | |
|---|---|---|---|
| 7,660,199 B2 | 2/2010 | Drew | |
| 7,978,563 B2 | 7/2011 | Thornton et al. | |
| 8,605,542 B2* | 12/2013 | Coates | G01V 1/226 |
| | | | 367/25 |
| 9,075,155 B2 | 7/2015 | Luscombe et al. | |
| 9,213,116 B2 | 12/2015 | Chambers et al. | |
| 9,377,551 B2* | 6/2016 | Hartog | G01V 1/42 |
| 9,720,118 B2* | 8/2017 | Petrella | E21B 47/107 |
| 10,073,184 B2* | 9/2018 | Faber | G01V 1/42 |
| 10,287,874 B2* | 5/2019 | Jin | G01K 11/32 |
| 10,316,641 B2* | 6/2019 | Constantinou | E21B 17/20 |
| 11,193,367 B2* | 12/2021 | Jin | E21B 47/10 |
| 2010/0223011 A1* | 9/2010 | Parsche | E21B 47/10 |
| | | | 702/11 |
| 2017/0102470 A1 | 4/2017 | Jeremic et al. | |
| 2017/0248717 A1 | 8/2017 | Bardainne | |
| 2019/0187317 A1 | 6/2019 | Watts et al. | |
| 2019/0227184 A1 | 7/2019 | Cuny et al. | |

OTHER PUBLICATIONS

Webster et al., "Micro-Seismic Detection Using Distributed Acoustic Sensing", SEG Technical Program Expanded Abstracts, pp. 2459-2463, 2013.
Ning, et al., Multicomponent Distributed Acoustic Sensing: Concept and Theory, Geophysics, 83(2), pp. 1-8, 2018.

* cited by examiner

LOCATING PASSIVE SEISMIC EVENTS IN A WELLBORE USING DISTRIBUTED ACOUSTIC SENSING

TECHNICAL FIELD

The present disclosure relates generally to using distributed acoustic sensors in downhole wellbore operations. More particularly, the present disclosure relates to a system that locates passive seismic events using distributed acoustic sensors.

BACKGROUND

A well system (e.g., oil or gas) may include a wellbore drilled through a subterranean formation. The subterranean formation may include a rock matrix permeated by oil or gas that is to be extracted using the well system. Hydraulic fracturing operations performed on the subterranean formations may provide access to oil or gas that is located within the rock matrix. Further, the hydraulic fracturing operations may be controlled based on estimates of the locations of microseismic events. The estimated microseismic event locations may be used to map fracture networks during a hydraulic fracturing operation.

Uncertainty may exist in estimating locations of the microseismic events. For example, a single fiber optic cable in a distributed acoustic sensor may provide a non-unique result due to an inability to distinguish a directionality of P and S waves generated by a microseismic event. To resolve this uncertainty, systems use multiple distributed acoustic sensors (e.g., in more than one observation well), multiple fiber optic cables within an individual well, require distributed acoustic sensor readings from orthogonal sections of the fiber optic cable (e.g., one reading along a vertical section of a wellbore and one reading along a horizontal section of the wellbore), or known rock-velocity heterogeneity and rock-velocity anisotropy of the rock surrounding the fiber optic cable with spatial irregularities in well deviation. These techniques each introduce added equipment expense (e.g., when deploying multiple sensors or fiber optic cables), added computational expenses (e.g., with increased complexity associated with multiple readings), or a combination thereof.

DETAILED DESCRIPTION

Certain aspects and features relate to distributed acoustic sensors and detecting a location of a microseismic event. In particular, a unique location of the microseismic event may be estimated in relation to a wellbore using a distributed acoustic sensor. In some examples, the distributed acoustic sensor includes a reflectometer and a fiber optic cable. A unique location of a microseismic event may be estimated in relation to the fiber optic cable that is positioned within a wellbore. For example, the fiber optic cable can be coupled to or otherwise positioned downhole along a length of a wellbore. The fiber optic cable may be communicatively coupled to a reflectometer at a surface of the wellbore. The fiber optic cable and the reflectometer may combine to form a distributed acoustic sensor that can detect strain and displacement along the length of the fiber optic cable. In one example, a microseismic event within a formation surrounding the wellbore may provide a source of the detected strain and displacement along the fiber optic cable. Using the strain detected along the fiber optic cable, a known focal mechanism of the formation, and known velocities of seismic waves, a unique location of the microseismic event can be estimated by the distributed acoustic sensor. The focal mechanism may be a direction of slip of a formation surrounding a wellbore due to the microseismic event and an orientation of a fault on which the microseismic event occurs within the formation.

In some examples, a fiber optic cable is positioned in a well that is undergoing hydraulic fracturing treatment or is a nearby well not directly involved in the hydraulic fracturing treatment. The fiber optic cable may be reasonably close to the treatment well (e.g., between 100 and 2000 feet). The fiber optic cable may be communicatively coupled to a distributed acoustic sensing recording system (e.g., a reflectometer). This system is capable of measuring changes in strain along the fiber at a number of locations.

A data processing algorithm, as described in detail below with respect to FIGS. 1-6, outputs an estimated source function of both P and S waves. The estimated source function may represent a maximum likelihood of possible passive seismic event (i.e., a microseismic event) location in time and space. A locally global maximum of the source function may represent the most probable event location.

A complete monitoring project would include deployment of the fiber optic cable, communicatively coupling the fiber optic cable to a reflectometer, and running a distributed acoustic sensing data acquisition. The monitoring project may also include storing resulting data in a storage medium and processing the data using the data processing algorithm. Further, the monitoring project may include displaying an output of the data processing algorithm, computing aggregate metrics on an effectiveness of the hydraulic fracture treatment, and using the results within a hydraulic fracture automation system (e.g., to control the hydraulic fracturing treatment).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
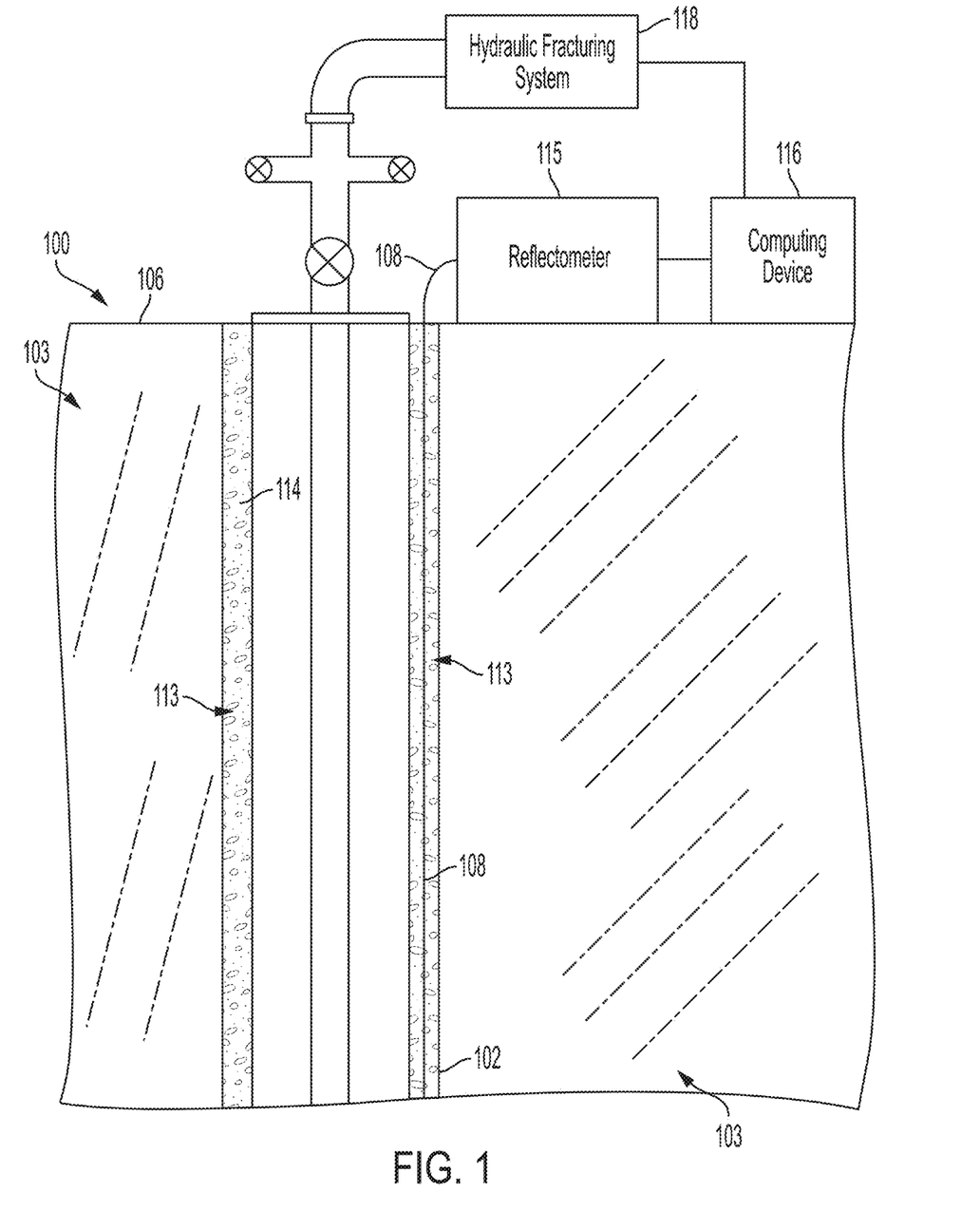
FIG. 1 is a schematic view of a well with a system for controlling a wellbore completion operation according to some aspects of the disclosure.

FIG. 1 schematically illustrates an example of a well system 100 that includes capability for estimating locations of microseismic events surrounding a wellbore 102 according to some aspects of the disclosure. The wellbore 102 may be created by drilling into a formation 103 (e.g., a hydrocarbon bearing formation). To access hydrocarbons stored within the formation 103, hydraulic fracturing operations may be conducted after the wellbore 102 is drilled. A hydraulic fracturing operation generally includes pumping hydraulic fracturing fluid under pressure into a section of the wellbore 102. The pressure of the hydraulic fracturing fluid creates fractures within the formation 103. Through these fractures, hydrocarbons are able to flow into the wellbore 102 more freely.

The well system 100 may include a length of fiber optic cable 108. As illustrated, the fiber optic cable 108 may be communicatively coupled to a reflectometer 115. In operation, the fiber optic cable 108 and the reflectometer 115 may be used to perform distributed acoustic sensing operations within the wellbore 102. For example, the fiber optic cable 108 and the reflectometer 115 may both be part of a distributed acoustic sensor (e.g., the reflectometer 115 may inject optical signals into the fiber optic cable 108 and detect variations in a reflection signal received from the fiber optic cable 108). In one or more examples, the reflectometer 115 is a coherent optical time domain reflectometer. The distributed acoustic sensing operations within the wellbore 102 may provide a mechanism to determine locations of microseismic events caused by the hydraulic fracturing operations that result in the fractures within the formation 103.

The fiber optic cable 108 may be attached to an outer surface of a casing 114, the fiber optic cable 108 may be suspended from a surface 106 of the wellbore 102 between the casing 114 and a wall of the wellbore 102 (e.g., within cement 113 between the casing 114 and the wall of the wellbore 102), or the fiber optic cable 108 may be positioned within the casing 114. The reflectometer 115 may be communicatively coupled to a computing device 116. The reflectometer 115, the computing device 116, or both may be positioned at a surface 106 of the well system 100. In some examples, the reflectometer 115 may be an optical time-domain reflectometer. Any other types of reflectometers may also be used. The reflectometer 115 may detect acoustic events near the fiber optic cable 108 (e.g., vibration of the formation 103 resulting from seismic waves) that contribute to strain or displacement of the fiber optic cable 108.

In one example, the computing device 116 may be a computing device with a data acquisition system that can receive the output from the reflectometer 115 and process the output using various analysis and visualization tools. The computing device 116 may include a processor and a non-transitory computer-readable medium that includes instructions that are executable by the processor to perform various operations described herein with regard to FIGS. 1-6.

The distributed acoustic sensor, which may include the fiber optic cable 108, the reflectometer 115, and the computing device 116, is able to measure changes in strain in the fiber optic cable 108 at a number of locations along a length of the fiber optic cable 108. For example, the distributed acoustic sensor may measure changes in strain in 1 meter increments along the length of the fiber optic cable 108. Other section lengths of the fiber optic cable 108 that are either larger or smaller than 1 meter are also contemplated. The distributed acoustic sensor may measure the changes in strain along the fiber optic cable 108 at a rate of 100 to 50,000 measurements per second. A resulting data stream is used in a processing algorithm to determine a unique location of a microseismic event. The data stream may be represented as $\{\varepsilon_{\hat{d}\hat{d}}(x_r, t)\}N_r$, where $\varepsilon$ is the strain, $\hat{d}=\hat{d}(x_r)$ and is a direction of the fiber optic cable 108 at a location $x_r$, $N_r$ is a number of locations $x_r$ along a length of the fiber optic cable 108, and r is a sequence of numbers from 1 to $N_r$. In an example where the fiber optic cable is 1000 meters in length, and the distributed acoustic sensor measures in 1 meter increments, the number of locations where the strain data is obtained (i.e., $N_r$) is equal to 1000.

In an example, a hydraulic fracturing system 118 may control a hydraulic fracturing operation that results in the microseismic event. As the computing device 116 locates the microseismic events, the hydraulic fracturing system 118 may map locations of the microseismic events. Mapping the locations of the microseismic events may provide an operator of the hydraulic fracturing system 118 with an understanding of the efficiency of the hydraulic fracturing operation. Accordingly, the operator is able to adjust parameters of the hydraulic fracturing operation to improve hydraulic fracturing efficiency. For example, the hydraulic fracturing system 118 may control proppant concentrations in the hydraulic fluid, pumping rate of the hydraulic fluid, hydraulic fluid pressure, or any other hydraulic fracturing parameters to increase the hydraulic fracturing efficiency based on the located microseismic events.

Figure 2:
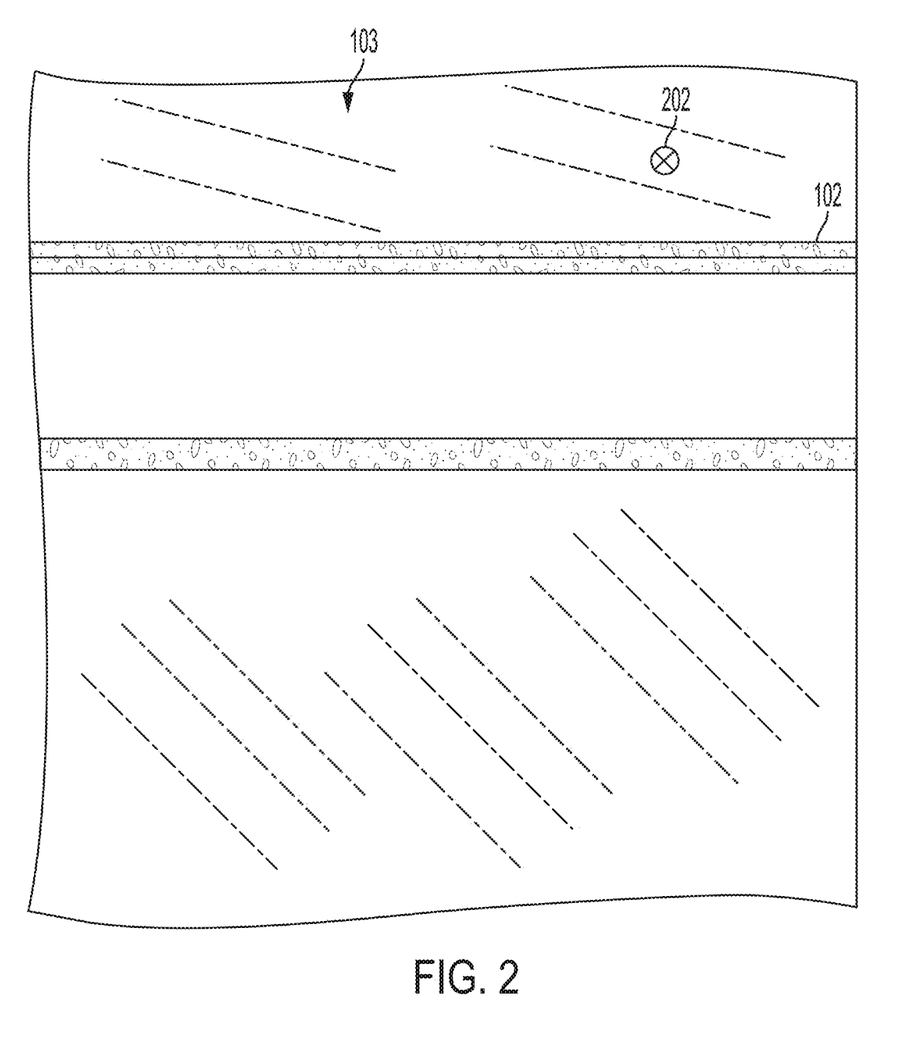
FIG. 2 is a schematic view of a horizontal section of a wellbore with a microseismic event according to some aspects of the disclosure.

FIG. 2 is a schematic view of a horizontal section of the wellbore 102 according to some aspects of the disclosure. While FIG. 2 is described and illustrated as a horizontal section of the wellbore 102, the description of FIG. 2 provided below is equally applicable to a vertical section of the wellbore 102. Further, in an example, the wellbore 102 may be a vertical wellbore that does not include a horizontal portion. That is, the operations described herein may work without reliance on the fiber optic cable 108 providing readings in two directions (e.g., vertical and horizontal).

As discussed above with respect to FIG. 1, the fiber optic cable 108 extends along a length of the wellbore 102. During a hydraulic fracturing operation, seismic waves originating from a microseismic event 202 may scatter or otherwise affect light pulses travelling within the fiber optic cable 108. In an example, the microseismic event 202 results in a fracture within the formation 103.

Without relying on additional fiber optic cables positioned within the wellbore 102 or positioned in neighboring wells, the reflectometer 115 and the computing device 116 may be able to estimate a unique location of the microseismic event 202. For example, a focal mechanism of the formation 103 may be used in combination with strain detected along the fiber optic cable 108 to identify a unique location of the microseismic event 202 (e.g., instead of a ring of possible locations surrounding the fiber optic cable 108). In an example, the focal mechanism describes a direction of slip of the microseismic event 202 and an orientation of a fault on which the microseismic event 202 occurs. The focal mechanism may vary depending on a location of the wellbore 102 within a field. Further, the focal mechanism may vary depending on where in the formation 103 surrounding the wellbore 102 the microseismic event 202 is detected.

The focal mechanism may be identified based on known information about the formation 103. The focal mechanism can be determined by: (1) conventional microseismic surveys (e.g., using geophones) employed downhole or on the surface; (2) a world stress map, which relies on earthquake seismology data; (3) analyzing image logs and core samples; (4) or a combination thereof. The velocities of P and S waves can be determined by: (1) an inversion using events with a known location (e.g., from perforation shots), which may be referred to as a velocity calibration; (2) using well log data; (3) using other seismic methods (e.g., vertical seismic profiling, reflection seismology, etc.) Therefore, an operator of the hydraulic fracturing equipment may know the focal mechanism and seismic velocities of the formation 103 or focal mechanisms and seismic velocities in varying regions of the formation 103 from general knowledge of the field in which the wellbore 102 resides. In knowing the focal mechanism, and using the focal mechanism to determine the unique location of the microseismic event 202, the location of the microseismic event 202 can be estimated even if a velocity field is homogeneous and isotropic, the distributed acoustic sensor collects data over a perfectly horizontal portion of the well, only an individual observation well is used, only an individual fiber optic cable is used, or any combination of these scenarios is present.

As illustrated in FIG. 2, the wellbore 102 may have a horizontal portion, while in other configurations the wellbore 102 may include only a vertical portion. Further, the fiber optic cable 108 may be positioned within a well that runs near a well undergoing a hydraulic fracturing operation. For example, the fiber optic cable 108 may be located in a well that is within 100 to 2000 feet of the well undergoing the hydraulic fracturing operation. In such a scenario, the well including the fiber optic cable 108 is able to interact with the seismic waves of the microseismic event 202 generated by the hydraulic fracturing operation of the other well.

Figure 3:
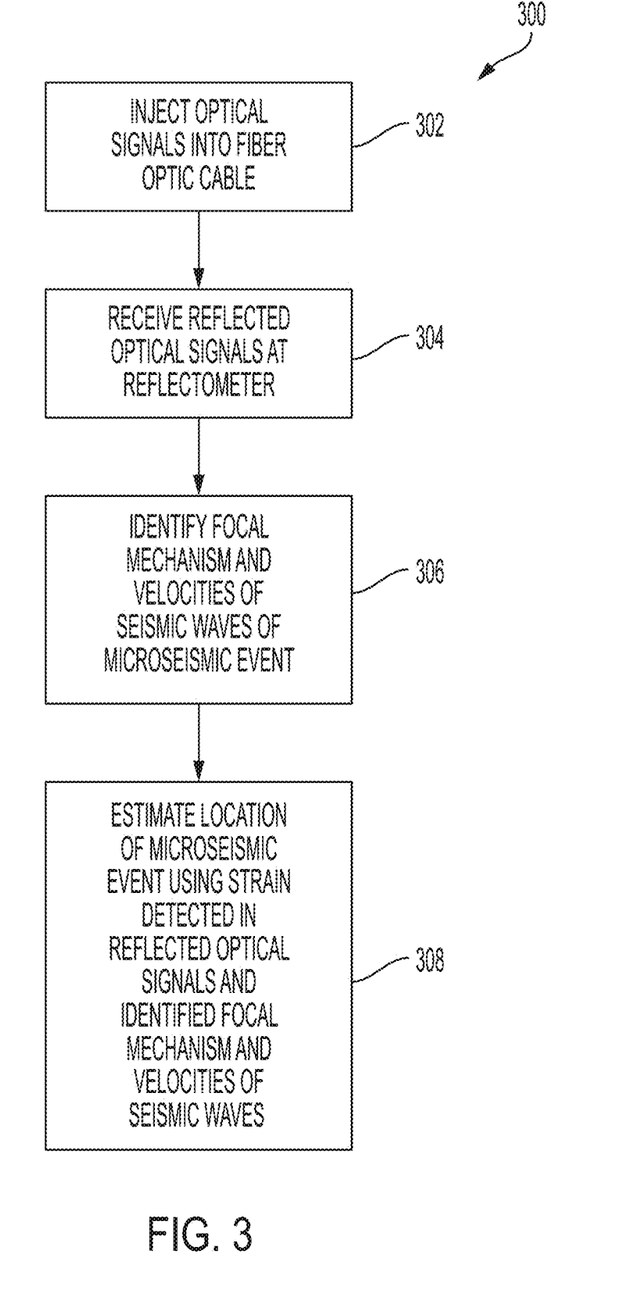
FIG. 3 is a flowchart of a process for estimating a unique location of a microseismic event according to certain aspects of the disclosure.

FIG. 3 is a process 300 for estimating a unique location of the microseismic event 202 according to certain aspects of the disclosure. At block 302, the process 300 involves injecting optical signals into the fiber optic cable 108. In an example, the reflectometer 115 injects light pulses into the fiber optic cable 108. An interaction between the fiber optic cable 108 and seismic waves associated with the microseismic event 202 may interfere with the light pulses. The interference with the light pulses may be generated by strain on the fiber optic cable 108 resulting from the seismic waves of the microseismic event 202.

At block 304, the process 300 involves receiving reflected optical signals at the reflectometer 115. The reflected optical signals received by the reflectometer 115 may include the light pulses that have been affected by the seismic waves of the microseismic event 202 interacting with the fiber optic cable 108. Using the reflected signals received at the reflectometer 115, the computing device 116 is able to read strain on the fiber optic cable 108 at varying locations resulting from the microseismic event 202.

At block 306, the process 300 involves identifying a focal mechanism of the microseismic event 202 and identifying velocities of P waves, S waves, or both. As discussed above in the discussion of FIG. 2, the focal mechanism describes a deformation in a source region that generates the seismic waves (e.g., the microseismic event 202). The focal mechanism and the velocity of the seismic waves (e.g., the P waves and the S waves) may vary depending on a location of the wellbore 102 within a field, and the focal mechanism and the velocity of the seismic waves may vary depending on where in the formation 103 surrounding the wellbore 102 the microseismic event 202 is detected. The focal mechanism and the velocity of the seismic waves may be identified based on known information about the formation 103 surrounding the wellbore 102.

Figure 5:
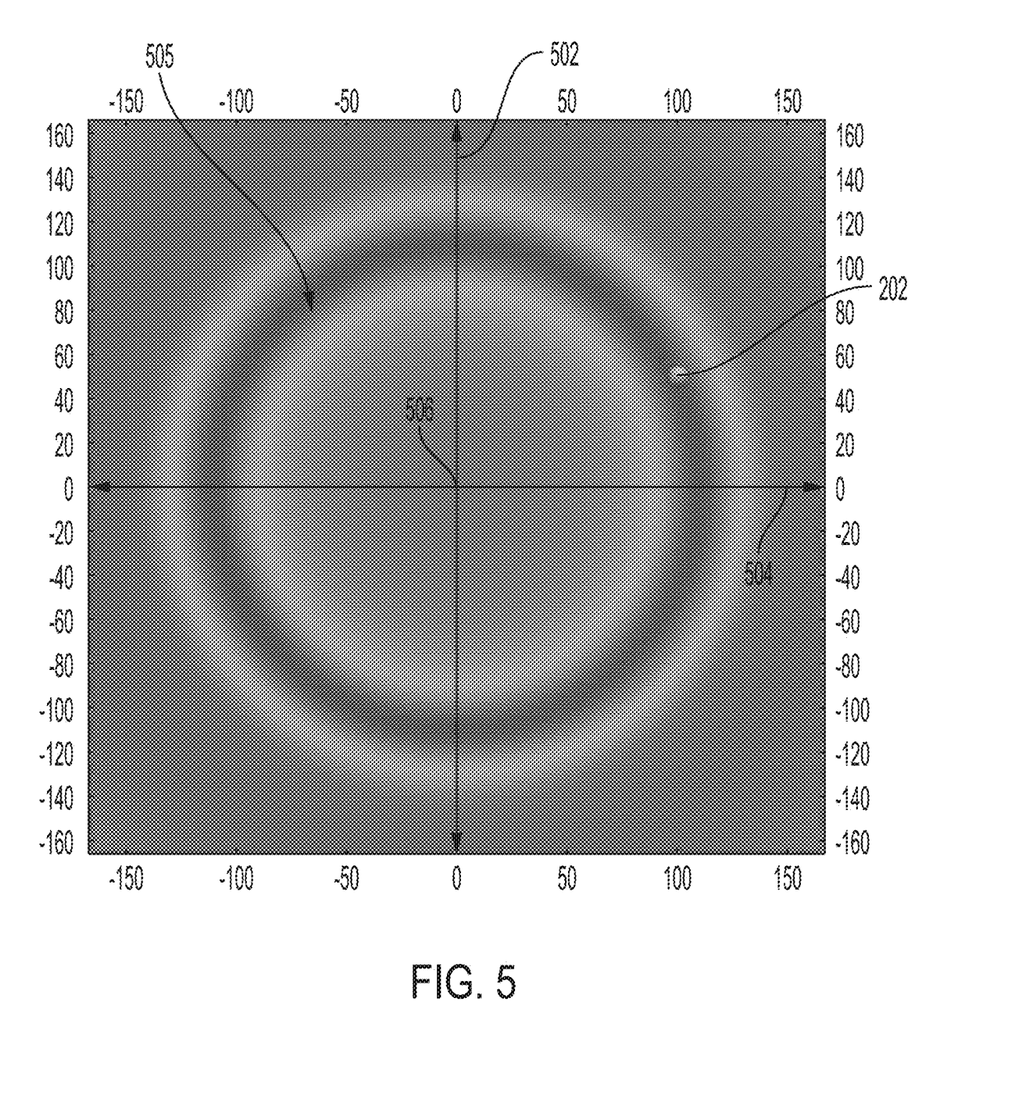
FIG. 5 is an intensity plot that indicates possible source locations of the microseismic event according to some aspects of the disclosure.

Further, while block 306 is illustrated in FIG. 3 as occurring after blocks 302 and 304, the focal mechanism and seismic velocities may be identified prior to blocks 302 and 304 or concurrently with blocks 302 and 304. For example, when the wellbore 102 is drilled into a formation 103 with a uniform focal mechanism within the sensing range of the fiber optic cable 108 (e.g., within approximately 2000 feet of the fiber optic cable 108), the focal mechanism identified at block 306 may already be identified prior to injection of the optical signals into the fiber optic cable 108 at block 302. In another example, the formation 103 surrounding the wellbore 102 may include several known focal mechanisms within the sensing range of the fiber optic cable 108. Because the strain measured by the distributed acoustic sensor may be used to generate a ring of possible locations (i.e., a ring of uncertainty) surrounding the fiber optic cable 108, as depicted in FIG. 5 below, the computing device 116 may identify a particular focal mechanism of the portion of the formation 103 that includes the ring of uncertainty after the reflected optical signals are received at the reflectometer 115 in block 304.

At block 308, the process 300 involves estimating a location of the microseismic event 202 using the strain detected in the reflected optical signals and the identified focal mechanism of the microseismic event 202 and seismic velocity of seismic waves generated from the microseismic event 202. The estimated location may be a value x of an estimated source function, $f_{ps}(x, t)$, of both P and S waves. The estimated source function represents a maximum likelihood of a possible location of the microseismic event 202 at time t and space x. A locally global maximum of the estimated source function represents a most probable location of the microseismic event 202. In this manner, each microseismic event 202 includes an associated time ($t_0$) and a position ($x_s=(x_s, y_s, z_s)$) within the formation 103.

Mathematically, the microseismic event 202 can be characterized by a moment tensor (M), which describes the source forces that generate the seismic waves. The moment tensor is a symmetric second order rank tensor with six degrees of freedom. The moment tensor can also be decomposed into a function of a scalar seismic moment ($M_0$), which carries information about a size of the source, and a unitary part ($\hat{M}$), which carries information about a radiation pattern or focal mechanism. The moment tensor may be represented by the following equation:

$$M = \begin{bmatrix} m_{xx} & m_{xy} & m_{xz} \\ m_{xy} & m_{yy} & m_{yz} \\ m_{xz} & m_{yz} & m_{zz} \end{bmatrix} = \sqrt{2}\, M_0 \begin{bmatrix} \hat{m}_{xx} & \hat{m}_{xy} & \hat{m}_{xz} \\ \hat{m}_{xy} & \hat{m}_{yy} & \hat{m}_{yz} \\ \hat{m}_{xz} & \hat{m}_{yz} & \hat{m}_{zz} \end{bmatrix} = \quad \text{(Equation 1)}$$

$$\|M\|_F\, \hat{M}(\hat{m}_{xx}, \hat{m}_{xy}, \hat{m}_{xz}, \hat{m}_{yy}, \hat{m}_{yz}, \hat{m}_{zz}) = \|M\|_F\, \hat{M}(\hat{m})$$

where $\|M\|_F (=\sqrt{2}M_0)$ is the Frobenius norm of M.

To uniquely estimate the location of the microseismic event 202 from the source function $f_{ps}(x, t)$, a unique (adjoint) imaging operator $\hat{G}_{ps}^*$ is applied to measured data (i.e., the measured strain $\{\varepsilon_{\hat{d}\hat{d}}(x_r, t)\}N_r$). The unique imaging operator uses the known focal mechanism of the formation 103 surrounding the wellbore 102. The unique estimation of the location of the microseismic event 202 can be represented by the following equation:

$$f_{ps}(x, t) = \hat{G}_{ps}^*\{\varepsilon_{\hat{d}\hat{d}}(x_r, t)\}_{N_r} = \frac{1}{\|a_{ps}(\hat{m}, \hat{d}, x, x_r)\|} \quad \text{(Equation 2)}$$

$$\Sigma_{N_r} a_{ps}(\hat{m}, \hat{d}, x, x_r)\varepsilon_{\hat{d}\hat{d}}(x_r, t + \tau_{ps}(x, x_r))$$

where $a_{ps}(\hat{m}, \hat{d}, x, x_r)$ are modeling elongations of the strain from geometrical optics theory (e.g., Kirchoff, beamforming or diffraction stacking) for given values of $\hat{m}$, $\hat{d}$, x, and $x_r$ of P waves, S waves, or a combination of P and S waves. Further, $a_{ps}$ represents a predicted amplitude based on the model from the geometrical optics theory, $\hat{m}$ represents known information concerning the moment tensor and the focal mechanism, $\hat{d}$ represents a direction of the fiber optic cable 108, and $\tau_{ps}$ is a travel time, determined from given seismic velocities of P and S waves, from a subsurface location x to a location $x_r$ of a section of the fiber optic cable 108 where the strain is measured.

Once the source function is estimated using Equation 2, the location and origin time estimations of the microseismic event 202 may be determined using the following equation:

$$x_s, t_0 = \mathrm{argmax}\ f_{ps}(x, t) \quad \text{(Equation 3)}$$

Equation 3 locates a locally global maximum of the value of the source function $f_{ps}(x, t)$. The locally global maximum, when the adjoint imaging operator is used with the source function as in Equation 2, identifies a unique location that is estimated for the location of the microseismic event 202. The process 300 may use a P wave source function (e.g., $f_p(x, t)$), a single S wave source function (e.g., $f_s(x, t)$), multiple S wave source functions (e.g., $f_{s\_fast}(x, t)$ and $f_{s\_slow}(x, t)$) resulting from shear wave splitting, or any combination thereof.

In addition to using the geometrical optics theory, as described above, wave theory can also be used. In general, a linear problem is solvable to find $f_{ps}(x, t)$. For example, the following equation:

$$\varepsilon_{\hat{d}\hat{d}}(x_r, t) = G_{ps} f_{ps}(x, t) \quad \text{(Equation 4)}.$$

is solvable with a least-squares solution that is represented by the following equation:

$$f_{ps}(x,t) = (G^*_{ps} G_{ps})^{-1} G^*_{ps} \{\varepsilon_{\hat{d}\hat{d}}(x_r, t)\}_{N_r} \quad \text{(Equation 5)}$$

where $G_{ps}$ is Green's function or operator for a P wave or an S wave, and $G^*_{ps}$ is an adjoint of the Green's function or operator for the P wave or the S wave. The operators can be estimated using different theories (e.g., wave theory or geometrical optics theory). Using wave theory to estimate the operators may provide better results than geometrical optics theory in an example including complex velocity fields that require accurate identification.

Figure 4:
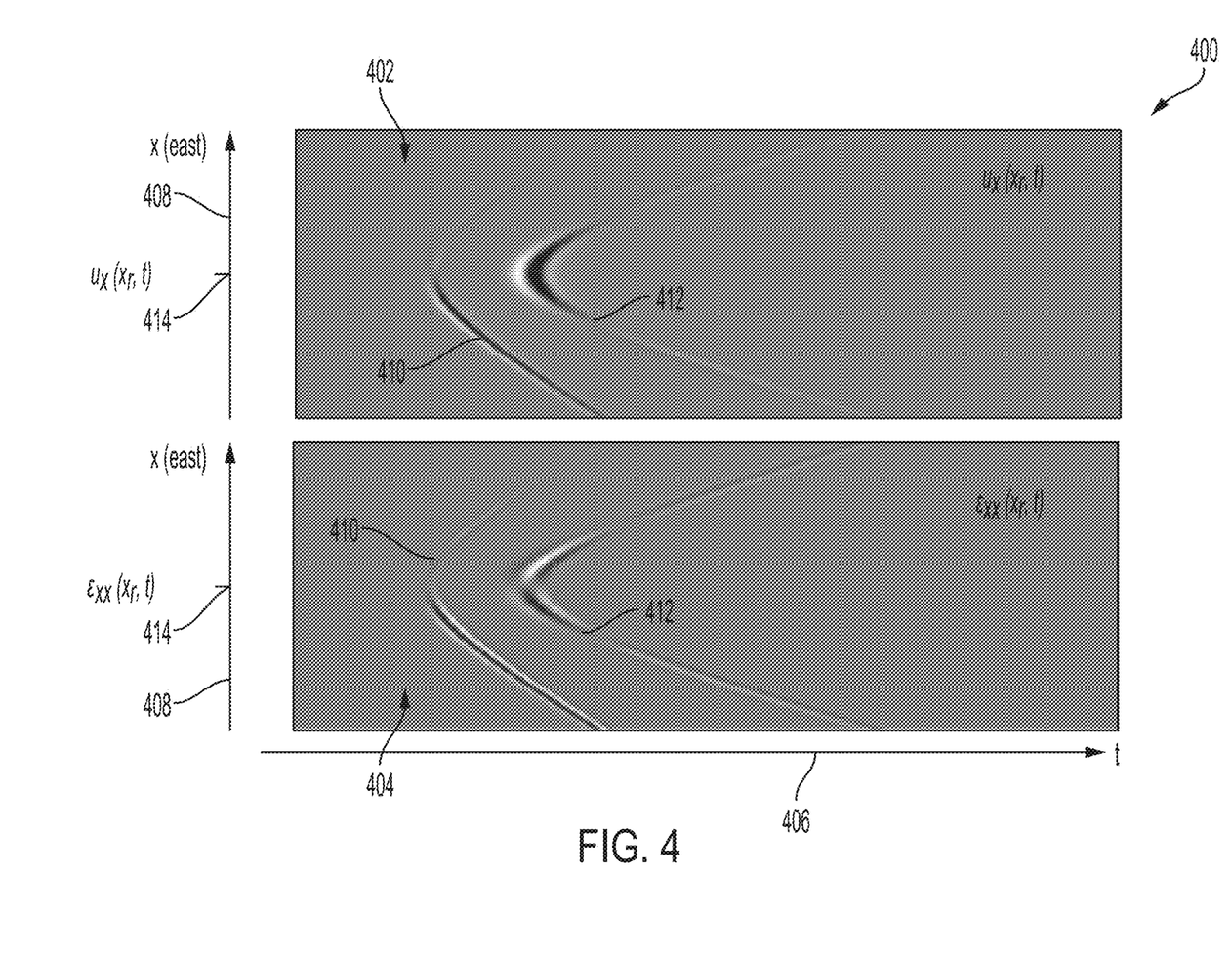
FIG. 4 is a plot of displacement and strain wave modeling along a fiber optic cable within the well of FIG. 1 according to some aspects of the disclosure.

FIG. 4 is a plot 400 of displacement wave modeling 402 and strain wave modeling 404 along a length of fiber optic cable 108 within the well system 100 according to some aspects of the disclosure. The displacement wave modeling 402 and the strain wave modeling 404 each represent a time 406 at which a P wave 410 and an S wave 412 of the microseismic event 202 reach specific portions 408 along the fiber optic cable 108. As illustrated, the P wave 410 reaches the fiber optic cable 108 faster than the S wave 412.

Further, the timing of the P wave 410 and the S wave 412 reaching the fiber optic cable 108 may enable a determination as to a location of the microseismic event 202 along an axis associated with the fiber optic cable 108. For example, an x component of the location of the microseismic event 202 may be a position along the fiber optic cable 108 where the P wave 410 and the S wave 412 reach first. As depicted in FIG. 4, a location 414 along the fiber optic cable 108 provides an indication of the x component of the location of the microseismic event 202 based on the P wave 410 and the S wave 412 initially reaching the fiber optic cable 108 at the location 414.

FIG. 5 is an intensity plot 500 that indicates possible source locations of the microseismic event 202 according to some aspects of the disclosure. The intensity plot 500 is an image of the source function $f_{ps}(x, t)$ integrated along the time axis at $x=x_s$ on a y-z plane without the unique (adjoint) imaging operator. The intensity plot 500 provides an indication of the possible locations of the microseismic event 202 based on the interaction of the seismic waves with light signals within the fiber optic cable 108. For example, even without using focal mechanism data, the distributed acoustic sensor can locate a point along a length of the fiber optic cable 108 (e.g., along the x-axis) that is perpendicular to the microseismic event 202. That is, the distributed acoustic sensor is able to locate the x component of the location of the microseismic event 202 based on the timing of the P wave 410 and the S wave 412 reaching varying portions of the fiber optic cable 108, as discussed above with respect to FIG. 4.

Using the illustrated source function $f_{ps}(x, t)$ at the location 414 (i.e., the x component of the location of the microseismic event 202), the intensity plot 500 provides an indication of the potential location of the microseismic event 202 along a z-axis 502 and a y-axis 504 to determine potential z and y components of the location of the microseismic event 202. As illustrated, the maximum intensities of the intensity plot 500 indicate the most likely locations of the microseismic event 202. Without using the unique (adjoint) imaging operator, the maximum intensities in the intensity plot 500 depict a ring 505 of possible locations (i.e., a ring of uncertainty) surrounding a location 506 of the fiber optic cable 108. The true location of the microseismic event 202 is depicted along the ring 505.

Figure 6:
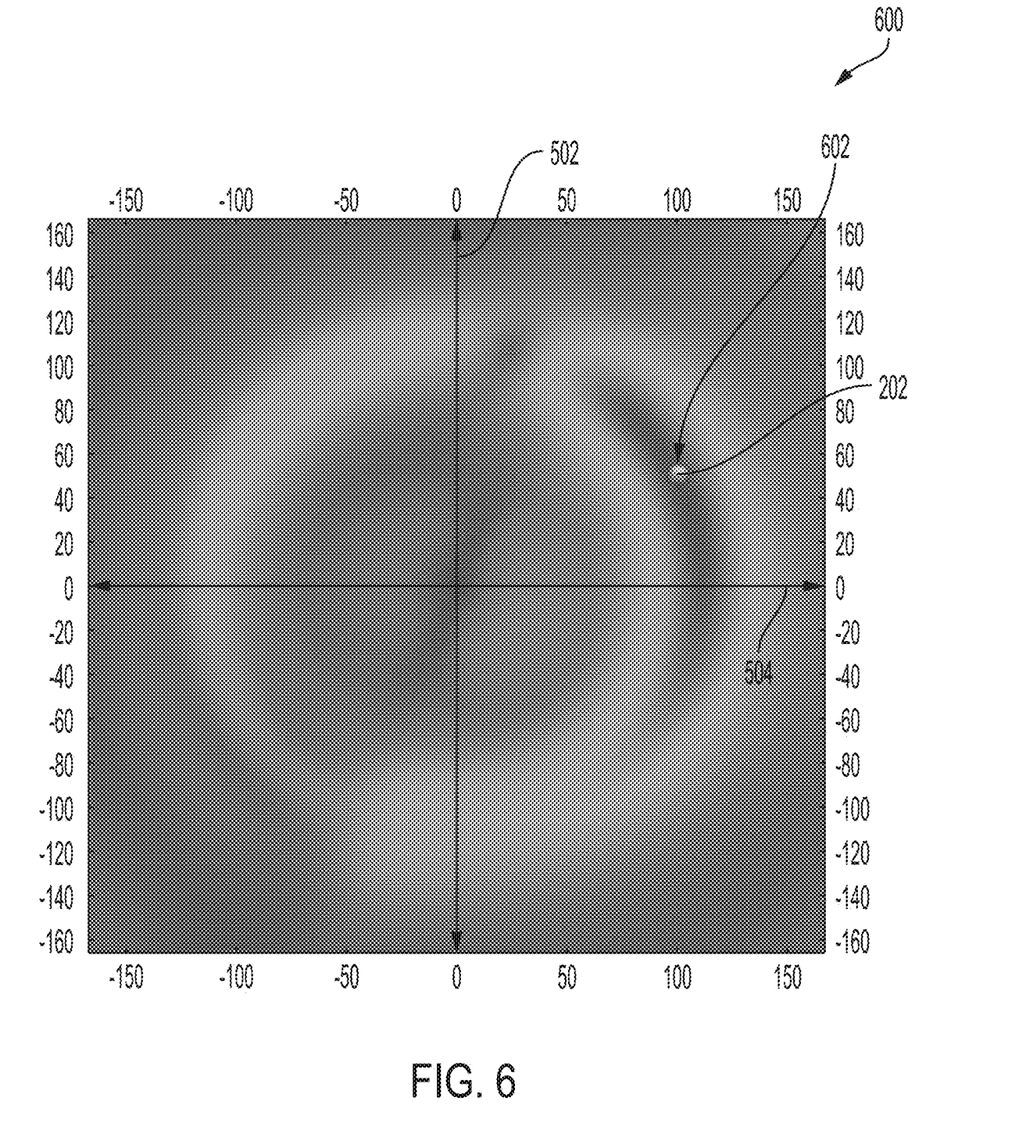
FIG. 6 is an intensity plot that indicates a unique estimated source location of the microseismic event according to some aspects of the disclosure.

FIG. 6 is an intensity plot 600 that indicates a unique estimated source location 602 of the microseismic event 202 according to some aspects of the disclosure. The intensity plot 600 is an image of the source function $f_{ps}(x, t)$ integrated along the time axis at $x=x_s$ on a y-z plane with the unique (adjoint) imaging operator. By including the unique (adjoint) imaging operator, a locally global maximum of the intensities indicated in the intensity plot 600 provides the unique estimated source location 602 at a location corresponding to the microseismic event 202. Thus, the unique (adjoint) imaging operator avoids the ring of uncertainty depicted in FIG. 5 and provides a unique estimate for the location of the microseismic event 202.

In some aspects, a system for using distributed acoustic sensors to estimate a unique location of a microseismic event is provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a well system comprising: a fiber optic cable positionable downhole along a length of a wellbore; and a reflectometer communicatively coupleable to the fiber optic cable to: inject optical signals into the fiber optic cable; receive reflected optical signals from the fiber optic cable; identify strain detected in the reflected optical signals generated from seismic waves of a microseismic event; identify a focal mechanism of the microseismic event; identify velocities of the seismic waves of the microseismic event; and determine a position of the microseismic event using the strain detected in the reflected optical signals, the focal mechanism of the microseismic event, and the velocities of the seismic waves.

Example 2 is the well system of example 1, wherein the reflectometer is further communicatively coupleable to the fiber optic cable to: estimate a source function of the strain by applying, to the strain, an adjoint imaging operator that is generated using the focal mechanism and the velocities of the seismic waves; and identify a local maximum of the source function to determine the position of the microseismic event within a formation surrounding the wellbore.

Example 3 is the well system of example 2, wherein the source function is based on geometrical optics theory or based on wave theory.

Example 4 is the well system of example 2, wherein the seismic waves of the microseismic event comprise P waves and S waves, and the source function of the strain is estimated using the strain from both the P waves and the S waves of the microseismic event.

Example 5 is the well system of examples 1-4, wherein the strain is detectable on a first portion of the fiber optic cable positioned along a horizontal portion of the wellbore.

Example 6 is the well system of examples 1-5, further comprising: a hydraulic fracturing system positionable to control a hydraulic fracturing operation within the wellbore, wherein parameters of the hydraulic fracturing operation are controllable by the hydraulic fracturing system based on the position of the microseismic event.

Example 7 is the well system of examples 1-6, further comprising: a second wellbore; and a hydraulic fracturing system positionable to control a hydraulic fracturing operation within the second wellbore to generate the microseismic event that generates the strain detected in the reflected optical signals.

Example 8 is the well system of examples 1-7, wherein the wellbore comprises a vertical wellbore.

Example 9 is the well system of examples 1-8, wherein the microseismic event is associated with a fracture within a formation surrounding the wellbore.

Example 10 is a method of determining a location of a microseismic event within a formation, the method comprising: injecting, by a reflectometer of a distributed acoustic sensor, optical signals into a fiber optic cable of the distributed acoustic sensor within a wellbore; receiving, at the reflectometer, reflected optical signals from the fiber optic cable; identifying, by the reflectometer, strain detected in the reflected optical signals generated from seismic waves of a microseismic event; identifying, by the distributed acoustic sensor, a focal mechanism of the microseismic event and velocities of the seismic waves; and determining, by the distributed acoustic sensor, a position of the microseismic event using the strain detected in the reflected optical signals, the focal mechanism of the microseismic event within the formation, and the velocities of the seismic waves.

Example 11 is the method of example 10, wherein determining the position of the microseismic event comprises: estimating, by the distributed acoustic sensor, a source function of the strain by applying, to the strain, an adjoint imaging operator that is generated using the focal mechanism and the velocities of the seismic waves; and identifying, by the distributed acoustic sensor, a local maximum of the source function to locate the position of the microseismic event within the formation.

Example 12 is the method of example 11, wherein the source function is determined based on wave theory.

Example 13 is the method of example 11, wherein the seismic waves of the microseismic event comprise P waves and S waves, and the source function of the strain is estimated using the strain identified from both the P waves and the S waves of the microseismic event.

Example 14 is a non-transitory computer-readable medium having program code that is stored thereon, the program code executable by one or more processing devices for performing operations comprising: receiving a signal from a reflectometer representing a strain along a length of a fiber optic cable that results from seismic waves of a microseismic event within a formation surrounding a wellbore; and determining a location of the microseismic event using the signal representing the strain along the length of the fiber optic cable, a focal mechanism of the microseismic event, and velocities of the seismic waves.

Example 15 is the non-transitory computer-readable medium of example 14, wherein the operation comprising determining the location of the microseismic event comprises: estimating a source function of the strain by applying an adjoint imaging operator to a data stream associated with the strain, wherein the adjoint imaging operator is generated using the focal mechanism and the velocities of the seismic waves; and identifying a local maximum of the source function to locate the location of the microseismic event.

Example 16 is the non-transitory computer-readable medium of example 15, wherein the source function is based on geometrical optics theory.

Example 17 is the non-transitory computer-readable medium of example 15, wherein the seismic waves of the microseismic event comprise P waves and S waves, and the source function of the strain is estimated using the strain from both the P waves and the S waves of the microseismic event.

Example 18 is the non-transitory computer-readable medium of examples 14-17, wherein the microseismic event is associated with a fracture within the formation surrounding the wellbore.

Example 19 is the non-transitory computer-readable medium of examples 14-18, wherein the strain is detectable on a portion of the fiber optic cable positioned within a horizontal section of the wellbore.

Example 20 is the non-transitory computer-readable medium of examples 14-19, further comprising: determining control parameters of a hydraulic fracturing system to control a hydraulic fracturing operation within the wellbore, wherein the control parameters are based on the location of the microseismic event.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A well system comprising:
   a fiber optic cable positionable downhole along a length of a wellbore;
   a reflectometer communicatively coupleable to the fiber optic cable to:
   inject optical signals into the fiber optic cable;
   receive reflected optical signals from the fiber optic cable;
   identify strain detected in the reflected optical signals generated from seismic waves of a microseismic event;
   identify a focal mechanism of the microseismic event;
   identify velocities of the seismic waves of the microseismic event; and
   determine a position of the microseismic event using the strain detected in the reflected optical signals, the focal mechanism of the microseismic event, and the velocities of the seismic waves; and a hydraulic fracturing system positionable to control a hydraulic fracturing operation within the wellbore, wherein parameters of the hydraulic fracturing operation are controllable by the hydraulic fracturing system based on the position of the microseismic event.

2. The well system of claim 1, wherein the reflectometer is further communicatively coupleable to the fiber optic cable to:
estimate a source function of the strain by applying, to the strain, an adjoint imaging operator that is generated using the focal mechanism and the velocities of the seismic waves; and
identify a local maximum of the source function to determine the position of the microseismic event within a formation surrounding the wellbore.

3. The well system of claim 2, wherein the source function is based on geometrical optics theory or based on wave theory.

4. The well system of claim 2, wherein the seismic waves of the microseismic event comprise P waves and S waves, and the source function of the strain is estimated using the strain from both the P waves and the S waves of the microseismic event.

5. The well system of claim 1, wherein the strain is detectable on a first portion of the fiber optic cable positioned along a horizontal portion of the wellbore.

6. The well system of claim 1, further comprising:
a second wellbore; and
a hydraulic fracturing system positionable to control a hydraulic fracturing operation within the second wellbore to generate the microseismic event that generates the strain detected in the reflected optical signals.

7. The well system of claim 1, wherein the wellbore comprises a vertical wellbore.

8. The well system of claim 1, wherein the microseismic event is associated with a fracture within a formation surrounding the wellbore.

9. A method of determining a location of a microseismic event within a formation, the method comprising:
injecting, by a reflectometer of a distributed acoustic sensor, optical signals into a fiber optic cable of the distributed acoustic sensor within a wellbore;
receiving, at the reflectometer, reflected optical signals from the fiber optic cable;
identifying, by the reflectometer, strain detected in the reflected optical signals generated from seismic waves of a microseismic event;
identifying, by the distributed acoustic sensor, a focal mechanism of the microseismic event and velocities of the seismic waves; and
determining, by the distributed acoustic sensor, a position of the microseismic event using the strain detected in the reflected optical signals, the focal mechanism of the microseismic event within the formation, and the velocities of the seismic waves, wherein determining the position of the microseismic event comprises:
estimating, by the distributed acoustic sensor, a source function of the strain by applying, to the strain, an adjoint imaging operator that is generated using the focal mechanism and the velocities of the seismic waves; and
identifying, by the distributed acoustic sensor, a local maximum of the source function to locate the position of the microseismic event within the formation.

10. The method of claim 9 wherein the source function is determined based on wave theory.

11. The method of claim 9, wherein the seismic waves of the microseismic event comprise P waves and S waves, and the source function of the strain is estimated using the strain identified from both the P waves and the S waves of the microseismic event.

12. A non-transitory computer-readable medium having program code that is stored thereon, the program code executable by one or more processing devices for performing operations comprising:
receiving a signal from a reflectometer representing a strain along a length of a fiber optic cable that results from seismic waves of a microseismic event within a formation surrounding a wellbore; and
determining a location of the microseismic event using the signal representing the strain along the length of the fiber optic cable, a focal mechanism of the microseismic event, and velocities of the seismic waves, wherein determining the location of the microseismic event comprises:
estimating a source function of the strain by applying an adjoint imaging operator to a data stream associated with the strain, wherein the adjoint imaging operator is generated using the focal mechanism and the velocities of the seismic waves; and
identifying a local maximum of the source function to locate the location of the microseismic event.

13. The non-transitory computer-readable medium of claim 12 wherein the source function is based on geometrical optics theory.

14. The non-transitory computer-readable medium of claim 12 wherein the seismic waves of the microseismic event comprise P waves and S waves, and the source function of the strain is estimated using the strain from both the P waves and the S waves of the microseismic event.

15. The non-transitory computer-readable medium of claim 12, wherein the microseismic event is associated with a fracture within the formation surrounding the wellbore.

16. The non-transitory computer-readable medium of claim 12, wherein the strain is detectable on a portion of the fiber optic cable positioned within a horizontal section of the wellbore.

17. The non-transitory computer-readable medium of claim 12, further comprising:
determining control parameters of a hydraulic fracturing system to control a hydraulic fracturing operation within the wellbore, wherein the control parameters are based on the location of the microseismic event.

* * * * *